United States Patent [19]

Yukawa et al.

[11] Patent Number: 5,296,551

[45] Date of Patent: Mar. 22, 1994

[54] SELF-CROSSLINKING RESIN

[75] Inventors: Yoshiyuki Yukawa, Hiratsuka; Motoshi Yabuta, Hadano; Akimasa Nakahata, Hiratsuka; Kazunori Mayumi, Aichi, all of Japan

[73] Assignee: Kansai Paint Company, Limited, Hyogo, Japan

[21] Appl. No.: 97,236

[22] Filed: Jul. 27, 1993

[30] Foreign Application Priority Data

Aug. 3, 1992 [JP] Japan .................................. 4-206662

[51] Int. Cl.$^5$ .............................................. C08G 81/02
[52] U.S. Cl. .................... 525/175; 525/124; 525/131
[58] Field of Search .................. 525/175, 124, 131

[56] References Cited

U.S. PATENT DOCUMENTS 4,539,218 9/1985 Geist ..................................... 525/124

Primary Examiner—Patricia A. Short
Attorney, Agent, or Firm—Armstrong, Westerman, Hattori, McLeland & Naughton

[57] ABSTRACT

The present invention provides
(1) a self-crosslinking resin (I) having a blocked isocyanate group and a hydroxyl group in the molecule and characterized in that the resin is prepared from a vinyl polymer (A) having at least two free isocyanate groups in the molecule and a polyester resin (B) having at least two hydroxyl groups in the molecule by reacting some of the hydroxyl groups of the resin (B) with some of the free isocyanate groups of the polymer (A), and subsequently reacting a blocking agent with all the remaining free isocyanate groups, and
(2) a self-crosslinking resin (II) having a blocked isocyanate group and a hydroxyl group in the molecule and characterized in that the resin is prepared from a vinyl polymer (C) having a free isocyanate group and a blocked isocyanate group in the molecule and the polyester resin (B) having at least two hydroxyl groups in the molecule by reacting some of the hydroxyl groups of the resin (B) with all the free isocyanate groups of the polymer (C).

8 Claims, No Drawings

SELF-CROSSLINKING RESIN

The present invention to novel self-crosslinking resins having within the molecule a blocked isocyanate group and a hydroxyl group which are reactive groups complementary to each other.

Two-pack or single-pack coating compositions wherein polyester polyol or like hydroxyl-containing polymer is cured with an isocyanate crosslinking agent produce cured coatings which are excellent in chemical resistance, physical properties, etc. and are therefore in wide use, for example, as motor vehicle coating compositions.

However, the two-pack composition has problems as to safety and hygiene when the isocyanate crosslinking agent is admixed with the other component or when the composition is applied, and further has the drawbacks that the coating preparation obtained by mixing the two components together has a short pot life before application, becomes viscous during coating operations and presents difficulty in cleaning the coating device. Single-pack coating compositions incorporating a blocked isocyanate crosslinking agent require a baking temperature usually of at least 150° C. because the blocking agent has a high dissociation temperature. These compositions have the drawback of being unusable for plastics materials which require baking at a low temperature (up to 120° C.). The single-pack composition has the further drawback of being not always satisfactory in the compatibility of the crosslinking agent, i.e., blocked isocyanate, with the polyester polyol serving as the base resin, such that even if they are compatible, the composition is low in curability and the cured coating formed differs in composition between the surface and the interior when observed microscopically and is low in gloss and surface smoothness.

To overcome these drawbacks, Unexamined Japanese Patent Publication No. 186722/1988 discloses a self-crosslinking resin which is prepared by copolymerizing a polymerizable monomer containing an isocyanate group or such a monomer containing a blocked isocyanate group with a polymerizable monomer containing a hydroxyl group to introduce the complementary reactive groups into the molecule.

Nevertheless, preparation of the disclosed resin involves problems When a radically polymerizable monomer containing an unblocked isocyanate group is copolymerized with a hydroxyl-containing radically polymerizable monomer as disclosed in the publication, it is difficult to prevent the reaction between the isocyanate group and the hydroxyl group even if the copolymerization reaction is conducted at the lowest possible temperature, with the result that gelation is liable to occur during the reaction. The polymerization reaction has other problems with respect to initiators. Since the isocyanate-containing monomer is a derivative of α-methylstyrene according to the publication, azo polymerization initiators fail to achieve a sufficient polymerization conversion, whereas peroxide or carbonate initiators, if used, require a temperature of at least 100° C. for the polymerization when a high conversion of polymerization is to be attained.

On the other hand, gelation is less likely to occur during the polymerization reaction when blocked isocyanate-containing polymerizable monomers are used. However, especially when the polymerizable monomer used contains an isocyanate group blocked with a phenol or oxime blocking agent, there arises a need to conduct the reaction at a relatively high temperature (120° to 140° C.), which entails the drawback of seriously coloring the product. If other blocking agents are used, a higher dissociation temperature will result, so that the self-crosslinkable resin obtained requires heating at a high temperature (at least 170° C.) for curing. When heated at a low temperature (e.g. up to 120° C.), the resin will not always be cured satisfactorily.

An object of the present invention is to provide a novel self-crosslinking resin which has a polyester resin skeleton and which can be prepared by a reaction without entailing gelation, coloration and a reduction in polymerization conversion.

Another object of the invention is to provide a self-crosslinking resin having a blocked isocyanate group and a hydroxyl group in the molecule and usable to provide single-pack compositions which are at least comparable to conventional two-pack compositions in coating properties and which can be handled and used for coating without any cumbersomeness unlike two-pack coating compositions and can be made curable at a low temperature.

These and other objects of the present invention will become apparent from the following description The present invention provides:

(1) a self-crosslinking resin (I) having a blocked isocyanate group and a hydroxyl group in the molecule and characterized in that the resin is prepared from a vinyl polymer (A) having at least two free isocyanate groups in the molecule and a polyester resin (B) having at least two hydroxyl groups in the molecule by reacting some of the hydroxyl groups of the resin (B) with some of the free isocyanate groups of the polymer (A), and subsequently reacting a blocking agent with all the remaining free isocyanate groups, and (2) a self-crosslinking resin (II) having a blocked isocyanate group and a hydroxyl group in the molecule and characterized in that the resin is prepared from a vinyl polymer (C) having a free isocyanate group and a blocked isocyanate group in the molecule and the polyester resin (B) having at least two hydroxyl groups in the molecule by reacting some of the hydroxyl groups of the resin (B) with all the free isocyanate groups of the polymer (C).

The self-crosslinking resins (I) and (II) of the present invention will be described below in greater detail.

The self-crosslinking resin (I) has a blocked isocyanate group and a hydroxyl group in the molecule and is prepared from a vinyl polymer (A) having at least two free isocyanate groups in the molecule and a polyester resin (B) having at least two hydroxyl group in the molecule by reacting some of the hydroxyl groups of the resin (B) with some of the free isocyanate groups of the polymer (A), and subsequently reacting a blocking agent with all the remaining free isocyanate groups.

Stated more specifically, the vinyl polymer (A), which has at least two free isocyanate groups in the molecule, is a polymer consisting essentially of an isocyanate-containing vinyl monomer (hereinafter referred to as the "NCO-containing monomer"), and further comprising other vinyl monomer when required. The polymer is chiefly a straight-chain polymer having terminal and/or side chain isocyanate groups.

The NCO-containing monomer is a compound having at least one unblocked isocyanate group and at least one radically polymerizable double bond in the molecule. Examples of such compounds are methacryloyl isocyanate, 2-isocyanate ethyl methacrylate, m- or p-isopropenyl-α,α'-dimethylbenzyl isocyanate and addition product of a hydroxyl-containing vinyl monomer with a diisocyanate compound in the mole ratio of 1:1. One or at least two of these compounds are usable.

The hydroxyl-containing vinyl monomer for use in preparing the NCO-containing monomer is a compound having at least one hydroxyl group and at least one radically polymerizable double bond in the molecule. Exemplary of such compounds are 2-hydroxyethyl (meth)acrylate, 2-hydroxypropyl (meth)acrylate, hydroxybutyl acrylate, 2,3-dihydroxypropyl acrylate, 2-hydroxy-3-phenoxyethyl acrylate, 2-hydroxy-3-ethoxyethyl acrylate and the like. Also usable is an equimolar adduct of acrylic acid or methacrylic acid with a glycol (having 2 to 20 carbon atoms).

The diisocyanate compound to be used for preparing the NCO-containing monomer is a compound having two isocyanate groups in the molecule. Examples of such compounds are aliphatic, aromatic and alicyclic diisocyanate compounds including tolylene diisocyanate, 4,4'-diphenylmethane diisocyanate, xylylene diisocyanate, hexamethylene diisocyanate, lysine diisocyanate, 4,4'-methylenebis(cyclohexyl isocyanate), methylcyclohexane-2,4(2,6)-diisocyanate, isophorone diisocyanate and trimethylhexane diisocyanate.

Preferable among these NCO-containing monomers are 2-isocyanate, m-isopropenyl-α,α'-dimethylbenzyl isocyanate and equimolar adduct of 2-hydroxyethyl acrylate with isophorone diisocyanate.

The vinyl polymer (A) is obtained by polymerizing such an NCO-containing monomer only, or copolymerizing the monomer with other vinyl monomer.

The other vinyl monomer is preferably a compound having a radically polyermizable double bond in the molecule but not having active hydrogen reactive with the isocyanate group. Examples of such compounds are styrene, α-methylstyrene, vinyltoluene and like aromatic vinyl monomers; methyl (meth)acrylate, ethyl (meth)acrylate, butyl¹ (meth)acrylate, 2-ethylhexyl (meth)acrylate, lauryl (meth)acrylate, tridecyl (meth)acrylate, stearyl (meth)acrylate, cyclohexyl (meth)acrylate, benzyl (meth)acrylate and like (meth)acrylic acid esters; Viscose 3F (brand name, product of Osaka Organic Chemical Industry Ltd., the same as hereinafter), Viscose 3MF, 8F and 8MF, perfluorocyclohexyl (meth)acrylate, N-2-propylperfluorooctanesulfonic acid amide ethyl (meth)acrylate, vinyl fluoride, vinylidene fluoride and like fluorine-containing vinyl monomers; N,N'-dimethylaminoethyl (meth)acrylate, N,N'-diethylaminomethyl (meth)acrylate, N,N'-diethylaminoethyl (meth)acrylate, N,N'-diethyl (meth)acrylamide and like nitrogen-containing vinyl monomers; vinyl ethyl ether, vinyl butyl ether and like vinyl ether monomers; and glycidyl (meth)acrylate, 3,4-epoxycyclohexylmethyl (meth)acrylate, arylglycidyl ether, alkyletherified methylolacrylamide, (meth)acrylamide, (meth)acrylic acid chloride, vinyl chloride, vinylidene chloride, (meth)acrylonitrile, γ-methacryloxyalkyltrimethoxysilane, etc. These compounds are used singly, or at least two of them are used in admixture.

The ratio of the NCO-containing monomer to the other vinyl monomer is not limited specifically insofar as the resulting polymer (A) has at least two free isocyanate groups in the molecule. The ratio of NCO-containing monomer/other vinyl monomer (by weight) is suitably 100/0 to 1/99, preferably 65/35 to 30/70.

The polymerization reaction of the NCO-containing monomer only or of this monomer with other vinyl monomer is usually conducted preferably in an inert organic solvent free from active hydrogen reactive with isocyanate groups. Examples of useful inert organic solvents are hexane, heptane, octane and like aliphatic hydrocarbons, benzene, toluene, xylene and like aromatic hydrocarbons, esters, ketones, etc. These solvents are used singly or in admixture. These solvents are likely to contain water, which is therefore preferably removed before use as required.

The polymerization reaction is conducted usually at a temperature of 50° to 180° C. in the presence of a radical polymerization initiator. The molecular weight of the polymer (A) is adjustable, for example, by varying the concentration of the reaction system or the amount of initiator. The concentration of the reaction system is in the range of 20 to 80 wt. % calculated as the polymer. To achieve an improved polymerization conversion, it is especially desirable to use a peroxide or carbonate initiator and conduct the reaction at a temperature of at least 100° C. It is more preferable to use an acrylate monomer in combination with the above monomer or monomers, whereby the polymer can be obtained with ease at a higher polymerization conversion. Although the polymerization initiator is usable at a concentration of 0.1 to 15 wt. % based on the whole amount of monomer or monomers, its concentration is preferably in the range of 0.1 to 10 wt. %.

For the polymerization, an electron beam, ultraviolet rays or the like can be used alternatively instead of the polymerization initiator.

Besides radical polymerization, ion polymerization or group transfer polymerization can be resorted to.

The polymer (A) for use in the present invention is preferably 500 to 50000, more preferably 1500 to 30000, in weight average molecular weight. It is suitable that the polymer be 30 to 200 g/1000 g resin in isocyanate value.

The polymer (A), which has at least two free isocyanate groups in the molecule, is preferably free from any active hydrogen reactive with the isocyanate groups.

The polyester resin (B) is a polyester resin having at least two hydroxyl groups in the molecule. The polyester resin (B) consists essentially of a polybasic acid (B-1) having at least two carboxyl groups in the molecule and a polyhydric alcohol (B-2) having at least two hydroxyl groups in the molecule, and further comprises a fatty acid and/or a fatty acid methyl ester (B-3) when required. The resin is obtained by esterification or ester exchange reaction so effected that the resulting product contains free hydroxyl.

Examples of useful polybasic acids (B-1) are phthalic acid (anhydride), terephthalic acid, isophthalic acid, tetrahydrophthalic acid (anhydride), hexahydrophthalic acid (anhydride), 4-methylhexahydrophthalic acid (anhydride), 3-methylhexahydrophthalic acid (anhydride), 3-methyltetrahydrophthalic acid (anhydride), trimellitic acid (anhydride), pyromellitic acid (anhydride), HET acid (anhydride), 3,6-endomethylenetetrahydrophthalic acid (anhydride), adipic acid, sebacic acid, azelaic acid, succinic anhydride, maleic anhydride, fumaric acid, itaconic acid, dimethyl isophthalate, dimethyl terephthalate, etc.

The polyhydric alcohol (B-2) is a compound having at least two alcoholic or phenolic hydroxyl groups in the molecule. Examples of such compounds are ethylene glycol, diethylene glycol, triethylene glycol, polyethylene glycol, 1,6-hexanediol, pentanediol, cyclohexanone dimethanol, propylene glycol, butylene glycol, butylene diglycol, trimethylolethane, trimethylolpropane, glycerin, neopentyl glycol, sorbitol, tris(2-hydroxyethyl)isocyanurate, diethanolamine, diisopropanolamine, bisphenol A, bisphenol F, etc.

Examples of useful fatty acids (B-3) are safflower oil fatty acid, linseed oil fatty acid, soybean oil fatty acid, perilla oil fatty acid, corn oil fatty acid, tall oil fatty acid, sunflower oil fatty acid, cotton seed oil fatty acid, tung oil fatty acid and like (semi)drying oil fatty acids, coconut oil fatty acid, olive oil fatty acid, palm oil fatty acid and like nondrying oil fatty acids.

According to the invention, it is generally desirable that the polyester resin (B) have an acid value (mg KOH/g resin) of less than 15, preferably up to about 10, and a hydroxyl value (mg KOH/g resin) of about 5 to about 400, preferably about 20 about 250. If the hydroxyl value is less than about 5, the self-crosslinking resin obtained exhibits impaired curability when applied, forming coatings which are lower in hardness, bending resistance and other properties. Conversely hydroxyl values greater than about 400 are undesirable since the coatings then obtained are inferior in water resistance, corrosion resistance and like properties.

The polyhydric alcohol (B-2) which is used for introducing hydroxyl groups into the polyester resin (B) is preferably a compound having at least three hydroxyl groups in the molecule.

It is generally desired that the polyester resin (B) have a weight average molecular weight of about 500 to about 50000, preferably about 1000 to about 30000, and a softening point of up to 150° C., preferably up to about 115° C.

The esterification reaction of the foregoing components for preparing the polyester resin (B) is conducted preferably in the presence of an organic solvent. In view of the introduction of urethane bonds due to a urethanation reaction between the vinyl polymer (A) and the resin (B), the organic solvent to be used for the esterification reaction is usually preferably an inert organic solvent free from any active hydrogen reactive with the isocyanate group. Examples of suitable solvents are those exemplified for the preparation of the polymer (A). Also suitable are hydrophilic or water-soluble solvents free from active hydrogen, such as diethylene glycol dimethyl ether, ethylene glycol dimethyl ether and the like.

On the other hand, in the case where the hydroxyl-containing polyester resin (B) is prepared in an organic solvent having active hydrogen, the reaction mixture can be distilled in a vacuum, concentrated or spray-dried to remove the organic solvent and thereafter used for urethanation reaction with the polymer (A).

Alternatively, the polyester resin (B) to be used is a resin obtained by ring opening polymerization of ε-caprolactam. Examples of such resins are Placcel 208, 240, 305 and 308 manufactured by Daicel Chemical Industries Ltd.

The reaction between the vinyl polymer (A) and the hydroxyl-containing polyester resin (B) for preparing the self-crosslinking resin (I) is a urethanation reaction between the isocyanate group and the hydroxyl group. Stated more specifically, the urethanation reaction is conducted by admixing the hydroxyl-containing polyester resin (B) with an organic solvent solution of the vinyl polymer (A) and heating the mixture usually at a temperature of 20° to 100° C., preferably 25° to 60° C. The reaction is controlled with reference to the reduction in the amount of isocyanate groups, i.e., isocyanate value. When required, tin compound or like catalyst may be used for this reaction. Suitably the amount of hydroxyl-containing polyester resin (B) to be used is such that the functional group ratio of the vinyl polymer (A) to the hydroxyl-containing polyester resin (B), that is, the NCO/OH ratio, is 0.1 to 10.0, preferably 0.5 to 5.0. Further based on the combined amount by weight of the two components, it is suitable to use 1 to 99 wt. %, preferably 10 to 70 wt. %, of the vinyl polymer (A) and 1 to 99 wt. %, preferably 30 to 90 wt. %, of the polyester resin (B). The proportions of these components are further such that the vinyl polymer (A), when having a weight average molecular weight of 500 to 50000, can be given an average of at least 0.1 urethane bond as introduced therein per molecule. The number of urethane bonds to be introduced into the vinyl polymer (A) is preferably 0.5 to 1.5, most preferably 1, per molecule when the polymer has a weight average molecular weight of 500 to 30000.

It is especially preferable to use a vinyl polymer comprising m-isopropenyl-α,α'-dimethylbenzyl isocyanate having a tertiary isocyanate group as the vinyl polymer (A) for preparing the self-crosslinking resin (I) because the reaction of this polymer with the hydroxyl-containing polyester resin (B) can be conducted without gelation and further because the resin then obtained forms coatings which are curable at low temperatures.

Thus, the vinyl polymer (A) has the hydroxyl-containing resin (B) added thereto and urethane bonds introduced therein by the reaction of the resin (B) with the polymer (A). The free isocyanate groups remaining in the vinyl polymer (A) are then reacted with a blocking agent and thereby completely blocked to obtain the self-crosslinking resin (I). Examples of useful blocking agents are phenol, cresol, xylenol, p-ethylphenol, o-isopropylphenol, p-tert-butylphenol, p-tert-octylphenol, thymol, p-naphthol, p-nitrophenol, p-chlorophenol and like phenols; methanol, ethanol, propanol, butanol, ethylene glycol, methyl cellosolve, butyl cellosolve, methyl carbitol, benzyl alcohol, phenyl cellosolve, furfuryl alcohol, cyclohexanol and like alcohols; dimethyl malonate, ethyl acetoacetate and like active methylene compounds; butyl mercaptan, thiophenol, tert-dodecyl mercaptan and like mercaptans; acetanilide, acetanisidide, acetamide, benzamide and like acid amides; succinimide, maleimide and like imides; diphenylamine, phenylnaphthylamine, aniline, carbazole and like amines; imidazole, 2-ethylimidazole and like imidazoles; urea, thiourea, ethyleneurea and like ureas; phenyl N-phenylcarbamate, 2-oxazolidone and like carbamic acid salts; ethyleneimine and like imines; formaldoxime, acetaldoxime, acetoxime, methyl ethyl ketoxime, methyl isobutyl ketoxime, cyclohexanoneoxime and like oximes; sodium bisulfite, potassium bisulfite and like sulfites; ε-caprolactam, δ-valerolactam, γ-butyrolactam, β-propiolactam and like lactams; etc. Especially preferable among these examples are phenol, lactam, alcohol and oxime blocking agents, while oxime blocking agents are most preferable in the case where baking at a low temperature (up to 120° C.) is required.

As a rule, it is desirable to use the blocking agent in an amount necessary to react with all the remaining free isocyanate groups.

The reaction between the blocking agent and the polymer (A) having the hydroxyl-containing polyester resin (B) added thereto is conducted usually at a temperature of 20° to 100° C. When required, a tin compound catalyst or the like may be used.

The self-crosslinking resin (II) has a blocked isocyanate group and a hydroxyl group in the molecule and is prepared from a vinyl polymer (C) having a free isocyanate group and a blocked isocyanate group in the molecule and the polyester resin (B) having at least two hydroxyl groups by reacting some of the hydroxyl groups in the resin (B) with all the free isocyanate groups in the polymer (C).

More specifically, the vinyl polymer (C), which has a free isocyanate group and a blocked isocyanate group in the molecule, is obtained by reacting a blocking agent with some of the free isocyanate groups in the vinyl polymer (A). Especially preferable as the vinyl polymer (A) for use in preparing the vinyl polymer (C) is a vinyl polymer (A) which is obtained using any of the above examples of NCO-containing monomers, preferably, for example, 2-isocyanate ethyl methacrylate, m-isopropenyl-α,α'-dimethylbenzyl isocyanate or an equimolar adduct of isophorone diisocyanate with 2-hydroxyethyl acrylate.

The blocking agent is admixed with the polymer (A) in an amount required to allow free isocyanate groups to remain in the polymer in such an amount that the subsequent reaction with the hydroxyl-containing polyester resin (B) will introduce approximately the same amount of urethane bonds into the polymer (A) as in the case of the self-crosslinking resin (I). It is especially desirable to use and react the blocking agent in an amount which allows free isocyanate groups to remain in such an amount that one urethane bond can be introduced into the polymer (A) per molecule thereof and which is needed to completely block the other free isocyanate groups.

Some of the hydroxyl groups in the hydroxyl-containing polyester resin (B) are then reacted with all the remaining free isocyanate groups in the polymer (C) which is prepared by reacting the blocking agent with the polymer (A), whereby the self-crosslinking resin (II) is obtained. Thus, it is required that the amount of hydroxyl groups in the resin (B) be larger than that of remaining free isocyanate groups.

The reaction of the blocking agent with the polymer (A) and the reaction of the resin (B) with the polymer (C) for preparing the self-crosslinking resin (II) are carried out in the same manner as those already described for the self-crosslinking resin (I).

With the self-crosslinking resins (I) and (II) of the present invention, the blocked isocyanate-containing resin molecule and the hydroxyl-containing polyester resin molecule are linked by a urethane bond formed by the reaction of the isocyanate group with the hydroxyl group. Accordingly, these resins are graft polymers of both resin molecules.

The self-crosslinking resins (I) and (II) thus obtained have at least one blocked isocyanate group and at least one hydroxyl group, and are preferably about 1000 to about 120000, more preferably about 5000 to about 50000, in weight average molecular weight.

When the self-crosslinking resins of the invention have equal amounts of blocked isocyanate and hydroxyl in the molecule, these resins produce self-crosslinking coatings having the highest degree of crosslinking. For use in coating compositions, adhesive compositions and the like, however, it is desired that either one of the functional groups be present in excess in view of adhesion to substrates and adjoining layers. It is suitable that the resins be about 25 to about 250 in hydroxyl value (mg KOH/g resin), and about 5 to about 250 in isocyanate value (g/1000 g resin) and less than 15, preferably less than 10, in acid value (mg KOH/g resin).

The term "isocyanate value" used herein refers to the content of free isocyanate groups in the resin. However, with resins having blocked isocyanate groups, these isocyanate groups are taken as unblocked in determining the isocyanate value.

The self-crosslinking resins of the invention can be dissolved or dispersed in organic solvents for use as coating compositions, adhesive compositions, printing inks, etc.

When the resin of the invention is to be used as a coating composition or the like, coloring pigments, metallic pigments, fillers, curing catalysts, surface conditioning agents, deterioration preventing agents, etc. are added to the resin as required to prepare a single-pack coating composition for use. Also usable with the resin of the invention are other ingredients including polyols, reactive diluents and other crosslinking agents (e.g., melamine resin, blocked isocyanates, and epoxy, acid, alkoxysilane and like compounds).

Examples of useful curing catalysts are tetraisopropyl titanate, tetrabutyl titanate, lithium acetate, iron(III) acetylacetonate, zinc 2-ethylhexonate, copper acetate, vanadium trichloride, tin octylate, dibutyltin diacetate, dibutyltin dioctoate, dibutyltin dilaurate, dibutyltin dimaleate, tetrabutyltin, dibutyltin oxide, tetra-n-butyl-1,3-diacetyloxydistannoxane, tetra-n-propyl-1,3-diacetyloxydistannoxane, tetra-n-butyl-1,3-dilauryloxydistannoxane and like metal-containing catalysts. These metal-containing catalysts may be used singly, or at least two of them are usable in admixture. Also preferably usable are tertiary amines such as trimethylamine, triethylamine, dimethylcyclohexylamine, N-tetramethylhexane-1,6-diamine, N-pentamethyldiethylenetriamine and 2-methyl-1,4-diazabicyclo[2,2,2]octane. Especially preferable are tin octylate, dibutyltin diacetate, dibutyltin dilaurate, distannoxanes and like organotin compounds. Dibutyltin diacetate is suitable to use in the case where baking at low temperatures is required. The amount of curing catalyst to be used is usually about 0 to about 5 wt. % relative to the self-crosslinking resin although variable depending on the kind thereof.

When the coating composition or the like comprising such ingredients is heated at a temperature of 60° to 180° C., preferably 80° to 140° C., isocyanate groups are regenerated from the blocked isocyanate groups in the presence or absence of the curing catalyst and react with hydroxyl groups, forming urethane bonds to give a three-dimensional crosslinked structure.

The present invention provides the following advantages.

(1) The self-crosslinking resins of the invention having both a blocked isocyanate group and a hydroxyl group are usable to give single-pack coating compositions. This completely eliminates the cumbersome procedure required, for example, of conventional thermally curable polyurethane coating compositions of the two-pack type, i.e., the procedure of measuring out specified amounts of two liquids immediately before use, mixing the liquids and applying the mixture within a period of time (pot life) during which it remains fully flowable.

(2) Since there is no need to use polymerizable monomers or solvents having active carbon in the NCO-containing monomer polymerization reaction system, the polymer (A) can be prepared without involving any gelation.

(3) In reacting the blocking agent with the polymer (A) to obtain the polymer (C), the reaction system is heated at a particular optimum temperature necessary for the blocking agent to react with isocyanate groups, so that blocking agents, such as phenol or oxime compounds, which are prone to coloration at high temperatures are usable for blocking at a temperature of up to about 80° C. without necessitating heating to a high temperature and without entailing any likelihood of coloration. Moreover, the blocking agent used is low in dissociation temperature (up to 100° C.) and is therefore advantageous for preparing compositions which are curable at low temperatures. Even if having a high dissociation temperature, the blocking agent can be reacted with the polymer (A) with ease free of any gelation.

(4) Since the polymer (A), the hydroxyl-containing polyester resin (B) and the polymer (C) are individually prepared before the resin (I) or (II) is prepared, the molecular weight and the number of functional groups of the desired resin can be determined readily.

(5) The self-crosslinking resins of the invention can be easily prepared by polymerization and grafting free of gelation, coloration or like objection, and can further be made curable at a low temperature.

(6) Polyester resins having a high hydroxyl value (for example, of at least about 180 mg KOH/g resin) are generally not fully compatible with other coating resins (such as acrylic resins), whereas the resins of the present invention are free of this problem since the resin of the invention comprises a polyester resin and other resin, i.e., acrylic resin, combined therewith through a urethane bond. Consequently, the resins of the invention have the characteristics of the two component resins, i.e., curability, gloss, distinctness-of-image gloss, surface smoothness, fatness, weather resistance, etc.

The present invention will be described below in greater detail with reference to the following examples, which nevertheless in no way limit the invention. The parts and percentates in the examples and comparative examples are all by weight.

EXAMPLE 1

Preparation of polymer (A)

Xylene (65 parts) was placed into a reactor equipped with a stirrer, reflux condenser and thermometer, and maintained at 130° C. with heating. The following mixture was added dropwise to the xylene over a period of 3 hours.

| | |
|---|---|
| m-Isopropenyl-α,α'-dimethylbenzyl isocyanate | 50 parts |
| n-Butyl acrylate | 30 parts |
| 2-Ethylhexyl acrylate | 20 parts |
| t-Butylperoxyisopropyl carbonate | 4 parts |

Subsequently, a mixture of 35 parts of xylene and 1.0 part of t-butylperoxyisopropyl carbonate was added dropwise to the resulting mixture over a period of 1 hour, followed by aging for 3 hours. (The reaction mixture will be referred to as a "vinyl polymer solution (A1).") The resin solution obtained was 50% in solids content and was a colorless transparent liquid. The solution was D in Gardner viscosity (as measured by a Gardner bubble viscometer at 25° C., the same as hereinafter), about 6000 in weight average molecular weight and 100 g/1000 g resin in isocyanate value.

Preparation of hydroxyl-containing polyester resin (B)

Into a reactor equipped with a stirrer, reflux condenser, rectification column and thermometer was placed a mixture of 58.1 parts of isophthalic acid, 53.9 parts of hexahydrophthalic anhydride, 95.55 parts of trimethylolpropane, 31.5 parts of neopentyl glycol and 86.1 parts of coconut oil fatty acid, and the mixture was reacted (dibasic acid ratio 0.7) in a nitrogen gas atmosphere at 160° to 230° C. with stirring for 10 hours to obtain a polyester resin which was 3 mg KOH/g resin in acid value, 167 mg KOH/g resin in hydroxyl value and 28.8 in oil length (amount (%) of fatty acid component of the resin). The polyester resin obtained was then dissolved in xylene to prepare a polyester resin solution (B1) having a solids content of 65%. The resin was about 5000 in weight average molecular weight.

Preparation of self-crosslinking resin (I)

Into a reactor equipped with a stirrer, reflux condenser and thermometer were placed 2000 parts of the vinyl polymer solution (A1) and 1538 parts of the polyester resin solution (B1), which were stirred at room temperature (25° C.) for 30 minutes. The isocyanate value of the resulting mixture varnish measured was 52.9 g/1000 g resin. (This value was taken as the initial isocyanate value.) The mixture was then maintained at 40° C. with heating and stirring for a further reaction for about 3 hours. When the isocyanate value decreased to 50.0 g/1000 g resin, 244.4 parts of methyl ethyl ketoxime was added to the mixture, which was thereafter aged at 60° C. for 2 hours. (The reaction mixture will be referred to as a "self-crosslinking resin (I-1)".)

The resin solution obtained was a slightly yellowish transparent liquid and S in Gardner viscosity. The resin solution was 62.0% in solids content, 69.5 mg KOH/g resin in hydroxyl value, 1.3 mg KOH/g resin in acid value, 50.0 g/1000 g resin in isocyanate value, 0.90 in NCO/OH ratio and about 11000 in weight average molecular weight. The resin solution was stored at 30° C. for 6 months, but no increase was found in its viscosity.

EXAMPLE 2

Dibutyltin dilaurate was added to the self-crosslinking resin (I-1) in an amount of 0.5 part per 100 parts of solids of the resin (I-1).

EXAMPLE 3

Preparation of polymer (A)

Xylene (65 parts) was placed into a reactor equipped with a stirrer, reflux condenser and thermometer, and maintained at 130° C. with heating. The following mixture was added dropwise to the xylene over a period of 3 hours.

| | |
|---|---|
| m-Isopropenyl-α,α'-dimethylbenzyl isocyanate | 40 parts |
| Styrene | 20 parts |
| n-Butyl acrylate | 35 parts |
| Methyl methacrylate | 5 parts |
| t-Butylperoxyisopropyl carbonate | 3 parts |

Subsequently, a mixture of 35 parts of xylene and 1.0 part of t-butylperoxyisopropyl carbonate was added dropwise to the resulting mixture over a period of 1 hour, followed by aging for 3 hours. (The reaction mixture will be referred to as a "vinyl polymer solution (A2)".) The resin solution obtained had a solids content of 50% and was a colorless transparent liquid. The solution was F in Gardner viscosity, about 9000 in weight average molecular weight and 80 g/1000 g resin in isocyanate value.

Preparation of hydroxyl-containing polyester resin (B)

Into a reactor equipped with a stirrer, reflux condenser, rectification column and thermometer was placed a mixture of 70.55 parts of isophthalic acid, 65.45 parts of hexahydrophthalic anhydride, 27.3 parts of trimethylolpropane and 84 parts of neopentyl glycol, and the mixture was reacted (dibasic acid ratio 0.85) in a nitrogen gas atmosphere at 160° to 230° C. with stirring for 10 hours to obtain a polyester resin which was 4 mg KOH/g resin in acid value and 125 mg KOH/g resin in hydroxyl value. The polyester resin obtained was then dissolved in xylene to prepare a polyester resin solution (B2) having a solids content of 65%. The resin was about 13000 in weight average molecular weight.

Preparation of self-crosslinking resin (I)

Into a reactor equipped with a stirrer, reflux condenser and thermometer were placed 2104 parts of the vinyl polymer solution (A2) and 1538 parts of the polyester resin solution (B2), which were then stirred at room temperature (25° C.) for 30 minutes. The isocyanate value of the resulting varnish measured was 41.0 g/1000 g resin. (This value was taken as the initial isocyanate value.) The mixture was then maintained at 40° C. with heating and stirring for a further reaction for about 3.5 hours. When the isocyanate value decreased to 37.8 g/1000 resin, 148 parts of acetoxime and 46.5 parts of xylene were added to the mixture, followed by aging at 60° C. for 2 hours. (The reaction mixture will be referred to as a "self-crosslinking resin (I-2).")

The resin solution obtained was a slightly yellowish transparent liquid and V in Gardner viscosity. The resin solution was 57.0% in solids content, 55.2 mg KOH/g resin in hydroxyl value, 1.8 mg KOH/g resin in acid value, 37.8 g/1000 g resin in isocyanate value, 0.9 in NCO/OH ratio and about 2000 in weight average molecular weight. The resin solution was stored at 30° C. for 6 months but no increase was found in its viscosity.

EXAMPLE 4

Dibutyltin dilaurate was added to the self-crosslinking resin (I-2) in an mount of 0.5 part per 100 parts of solids of the resin (I-2).

EXAMPLE 5

Preparation of polymer (A)

Xylene (65 parts) was placed into a reactor equipped with a stirrer, reflux condenser and thermometer, and maintained at 130° C. with heating. The following mixture was added dropwise to the xylene over a period of 3 hours.

| | |
|---|---|
| m-Isopropenyl-α,α'-dimethylbenzyl isocyanate | 60 parts |
| n-Butyl acrylate | 35 parts |
| Styrene | 5 parts |
| t-Butylperoxyisopropyl carbonate | 4 parts |

Subsequently, a mixture of 35 parts of xylene and 1.0 part of t-butylperoxyisopropyl carbonate was added dropwise to the resulting mixture over a period of 1 hour, followed by aging for 3 hours. (The reaction mixture will be referred to as a "vinyl polymer solution (A3)".) The resin solution obtained was 50% in solids content, B in Gardner viscosity, about 6000 in weight average molecular weight and 120.0 g/1000 g resin in isocyanate value.

Preparation of hydroxyl-containing polyester resin (B)

Into a reactor equipped with a stirrer, reflux condenser, rectification column and thermometer was placed a mixture of 45.45 parts of trimethylolpropane, 96.05 parts of cyclohexane dimethanol, 57.28 parts of cyclohexanedicarboxylic acid and 51.28 parts of hexahydrophthalic anhydride, and the mixture was reacted (dibasic acid ratio 0.666) in a nitrogen atmosphere for 14 hours with stirring to obtain a polyester resin which was 0.2 mg KOH/g resin in acid value and 241 mg KOH/g resin in hydroxyl value. The polyester resin obtained was then dissolved in xylene to prepare a polyester resin solution (B3) having a solids content of 70%. The resin was about 2600 in weight average molecular weight.

Preparation of self-crosslinking resin (II)

Into a reactor equipped with a stirrer, reflux condenser and thermometer were placed 2706 parts of the vinyl polymer solution (A3) and 322 parts of methyl ethyl ketoxime, which were then heated and stirred at 60° C. for 2 hours (vinyl polymer (C1)). To the product was added 1428 parts of the polyester resin solution (B3), and the mixture was aged at 40° C. for 4 hours until no free isocyanate groups remained. Subsequently, 32.5 parts of methyl ethyl ketoxime and 45.4 parts of xylene were added to the resulting mixture. (The reaction mixture will be referred to as a "self-crosslinking resin (II-1)".)

The resin solution obtained was a slightly yellowish transparent liquid and U in Gardner viscosity (as measured by a Gardner bubble viscometer at 25° C.). The resin solution was 59.0% in solids content, 87.5 mg KOH/g resin in hydroxyl value, 0.07 mg KOH/g resin in acid value, 60.6 g/1000 g resin in isocyanate value, 0.9 in NCO/OH ratio and about 10000 in weight average molecular weight. The solution was stored at 30° C. for 6 months, but no increase was found in its viscosity.

EXAMPLE 6

Dibutyltin diacetate was added to the self-crosslinking resin (II-1) in an amount of 0.5 part per 100 parts of solids of the resin (II-1).

Comparative Example 1

A clear coat composition was prepared by mixing together 610 parts of the polyester resin solution (B2), 487.5 parts of "80% Coronate 2507" (HDI blocked isocyanate manufactured by Nippon Polyurethane Industry Co., Ltd.) and 0.5 part, per 100 parts of the resin solids, of dibutyltin dilaurate. The composition was satisfactory in storage stability.

COMPARATIVE EXAMPLE 2

A clear coat composition was prepared by mixing together 610 parts of the polyester resin solution (B2), 487.5 parts of "80% Coronate 2507" (HDI blocked isocyanate manufactured by Nippon Polyurethane Industry Co., Ltd.) and 0.9 part, per 100 parts of the resin solids, of dibutyltin dilaurate. The composition was satisfactory in storage stability.

COMPARATIVE EXAMPLE 3

A mixture was prepared from 1428 parts of the polyester resin solution (B3), 375 parts of "80% Coronate 2507" and 0.9 part, per 100 parts of the resin solids, of dibutyltin dilaurate, but the main components were incompatible with each other and separated into different phases. The mixture was applied to a glass panel to a thickness of 40 μm (when dried) and baked at 140° C. for 30 minutes, whereas the mixture was not fully curable, failing to give a transparent coating.

The solutions or compositions of Examples 1 to 6 and Comparative Examples 1 and 2 were tested for storage stability, and also applied to tinplate to a thickness, as dried, of about 40 μm, baked at 120° C. or 140° C. for 30 minutes and thereafter checked for gel fraction ratio and xylol wipability. Table 1 shows the results. The test methods were as follows.

Storage stability

The sample was stored at 30° C. for 1 month, and if the resulting increase in viscosity was not greater than two reference increments of Gardner viscosity, the result was evaluated as "good".

Gel fraction ratio

The coating removed from the tinplate was subjected to extraction in a solvent mixture of acetone and methanol (1:1) under reflux, and the weight ratio of the resulting coating to the coating before extraction was determined.

Xylol wipability

The coating was forcibly rubbed with a piece of gauze wet with xylol reciprocatingly 20 times over a stroke length of 10 cm and thereafter checked for scratches or hazing. The result was evaluated according to the following criteria.
A: No scratches or hazing
B: Some scratches or slight hazing
C: Many scratches or considerable hazing

TABLE 1

|  | Curing catalyst | Storage stability | Gel fraction ratio (baking at 120° C./140° C.) | Xylol wipability |
| --- | --- | --- | --- | --- |
| Example 1 | None | Good | 92/95 | A |
| Example 2 | DBTDL | Good | 96/97 | A |
| Example 3 | None | Good | 92/94 | A |
| Example 4 | DBTDL | Good | 97/97 | A |
| Example 5 | None | Good | 93/97 | A |
| Example 6 | DBTDA | Good | 97/98 | A |
| Comp. Ex. 1 | DBTDL | Good | 38/79 | C |

In the above table, DBTDL stands for dibutyltin dilaurate, and DBTDA for dibutyltin diacetate.

The compositions of Example 6 and Comparative Example 2 were applied to tinplate to a thickness, as dried, of about 40 μm, baked at 100° C. for 30 minutes and thereafter tested for gel fraction ratio and xylol wipability in the same manner as above. Table 2 shows the results.

TABLE 2

|  | Gel fraction ratio | Xylol wipability |
| --- | --- | --- |
| Example 6 | 95 | A |
| Comp. Ex. 2 | 0 | C |

We claim:

1. A self-crosslinking resin having a blocked isocyanate group and a hydroxyl group in the molecule and characterized in that the resin is prepared from a vinyl polymer (A) having at least two free isocyanate groups in the molecule and a polyester resin (B) having at least two hydroxyl groups in the molecule by reacting some of the hydroxyl groups of the resin (B) with some of the free isocyanate groups of the polymer (A), and subsequently reacting a blocking agent with all the remaining free isocyanate groups.

2. A self-crosslinking resin as defined in claim wherein the vinyl polymer (A) is a polymer containing at least one isocyanate-containing vinyl monomer selected from 2-isocyanate ethyl methacrylate, m-isopropenyl-α,α'-dimethylbenzyl isocyanate and an adduct of 2-hydroxyethyl acrylate with isophorone diisocyanate and optionally further comprising other vinyl monomer or is a partially blocked product thereof.

3. A self-crosslinking resin as defined in claim 1 which is about 1000 to about 120000 in weight average molecular weight.

4. A self-crosslinking resin as defined in claim 1 which is about 25 to about 250 mg KOH/g resin in hydroxyl value and about 5 to about 250 g/1000 g resin in isocyanate value.

5. A self-crosslinking resin having a blocked isocyanate group and a hydroxyl group in the molecule and characterized in that the resin is prepared from a vinyl polymer (C) having a free isocyanate group and a blocked isocyanate group in the molecule and a polyester resin (B) having at least two hydroxyl groups in the molecule by reacting some of the hydroxyl groups of the resin (B) with all the free isocyanate groups of the polymer (C).

6. A self-crosslinking resin as defined in claim wherein the vinyl polymer (C) is a partially blocked product of a polymer containing at least one isocyanate-containing vinyl monomer selected from 2-isocyanate ethyl methacrylate, m-isopropenyl-α,α'-dimethylbenzyl isocyanate and an adduct of 2-hydroxyethyl acrylate with isophorone diisocyanate and optionally further comprising other vinyl monomer.

7. A self-crosslinking resin as defined in claim which is about 1000 to about 120000 in weight average molecular weight.

8. A self-crosslinking resin as defined in claim which is about 25 to about 250 mg KOH/g resin in hydroxyl value and about 5 to about 250 g/1000 g resin in isocyanate value.

* * * * *